APPARATUS FOR WRAPPING TAPE AROUND THREADED ARTICLES

Filed Feb. 13, 1967 7 Sheets-Sheet 1

INVENTOR
Robert A. Bilbrey
by Charles F. Voytech
Att'y

APPARATUS FOR WRAPPING TAPE AROUND THREADED ARTICLES

Filed Feb. 13, 1967 7 Sheets-Sheet 2

APPARATUS FOR WRAPPING TAPE AROUND THREADED ARTICLES
Filed Feb. 13, 1967 7 Sheets-Sheet 5
FIG. 19
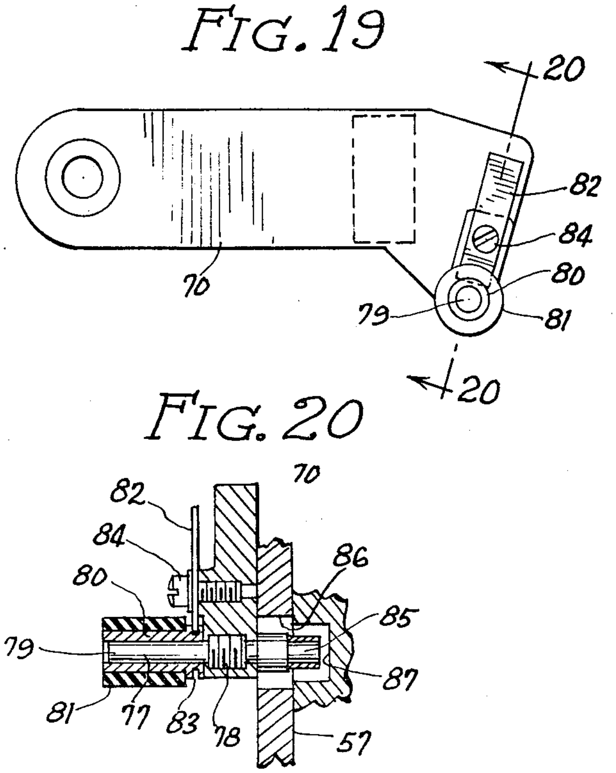
FIG. 19, FIG. 20
FIG. 21
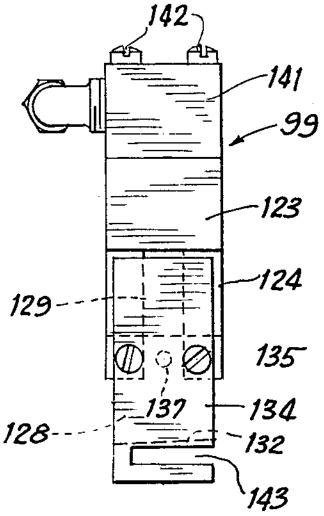
FIG. 22
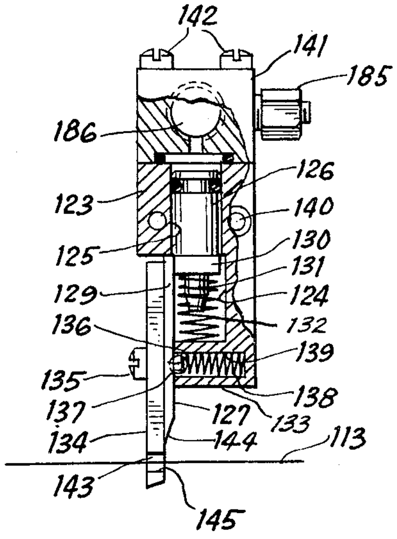

United States Patent Office 3,508,998

Patented Apr. 28, 1970

3,508,998
APPARATUS FOR WRAPPING TAPE AROUND THREADED ARTICLES

Robert A. Bilbrey, Orinda, Calif., assignor to Crane Packing Company, Morton Grove, Ill., a corporation of Illinois Filed Feb. 13, 1967, Ser. No. 615,519
Int. Cl. B65c *3/12, 3/16, 9/04*
U.S. Cl. 156—457 18 Claims

ABSTRACT OF THE DISCLOSURE

Apparatus comprises a rotatable deck carrying (1) a roll of tape; (2) tape feeding means; (3) tape cutting shears and (4) pressure rollers, and fluid pressure cylinders for operating these devices with cam-operated valves controlled by rotation of the deck for determining sequence of operation. Threaded article is held between rollers until one or more turns of the tape is wrapped around and rolled into threads. Insertion of article into apparatus initiates operation of apparatus, but apparatus shuts itself off upon completion of cycle.

BACKGROUND OF THE INVENTION

It has been found that thin unsintered tape made of polytetrafluoroethylene when inserted between the male and female threads of pipe fittings, threaded fasteners and the like, makes a good sealant. The application of the tape to the threaded article, usually on the male threads thereof, is difficult when done at the point of use. However, such tape has the ability to adhere to threads if sufficient pressure is applied to it so that it is possible to prewrap the articles and thus have them ready for use.

A machine has been proposed for prewrapping thin polytetrafluoroethylene tape under pressure to the male threads of an article such as a pipe fitting or bolt which spins the article between rollers while a section of tape is fed from an adjacent supply roll between the spinning article and its driving rollers. Such machine cannot, however, readily apply tape to irregularly shaped articles such as special fittings, or threaded stems of gauges because of the necessity for spinning the threads between the driving rollers.

Machines have also been proposed for continuously wrapping a tape around a pipe, wire, cable or machinery packing, wherein the tape was carried on one or more rolls mounted on a rotating, centrally apertured deck through which the pipe, etc., was passed, but such machines have not been capable of applying a relatively short piece of tape upon a stationary threaded article.

SUMMARY OF THE INVENTION

This invention resides in an apparatus for automatically rolling one or more turns of a tape upon a stationary threaded article such as a pipe fitting, bolt or the like, wherein the article may be inserted into the apparatus and held by the operator during the rolling operation.

As a specific object, this invention provides apparatus for rolling one or more turns of a tape upon an article wherein while one hand of the operator is used to hold the article in the apparatus, the other hand of the operator may be used to pick up and orient the next article to be taped.

A further specific object of this invention is an apparatus for automatically rolling a predetermined length of tape upon a threaded article wherein the operation of the machine is initiated automatically upon the insertion of the article into the machine, with means for readily adjusting the location of the rolled tape on the article.

Briefly summarized, this invention comprises a fixed frame on which are mounted an electric motor and a rotatable deck driven by the motor through reduction gearing. On the deck are mounted radially movable rollers arranged like a chuck to move simultaneously against the threaded article to be tape-wrapped. The article is held in place by the operator. On one of the radially movable roller supports is a cartridge containing a roll of the tape, and means are provided on this one roller support for feeding the tape from the cartridge between the article and the next roller, and for cutting the tape when the required amount has been fed. Small pneumatic cylinders mounted on the deck supply power for each operation, and valves rotatable with the deck determine the sequence of operation of the pneumatic cylinder and the overall cycle. A switch, energized by the article itself as it is inserted into the apparatus, automatically starts the motor, and another switch, operated by the rotating deck, automatically shuts off the motor. A manually controlled adjustment of the location of the first switch is used to shift the location of the wrapped tape relative to the end of the article.

BRIEF DESCRIPTION OF DRAWINGS

The preferred embodiments of this invention are illustrated in the accompanying drawings in which

FIG. 19 is an elevational view of one of the jaws of the chuck used to hold the threaded part to be wrapped;

FIG. 20 is a section through FIG. 19 taken along line 20—20 of FIG. 19;

FIG. 21 is a side elevational view of the cutting mechanism used to sever the wrapped tape;

FIG. 22 is a front elevational view of the cutting mechanism of FIG. 1, partly in section;

DESCRIPTION OF THE PREFERRED EMBODIMENTS

Figure 1:
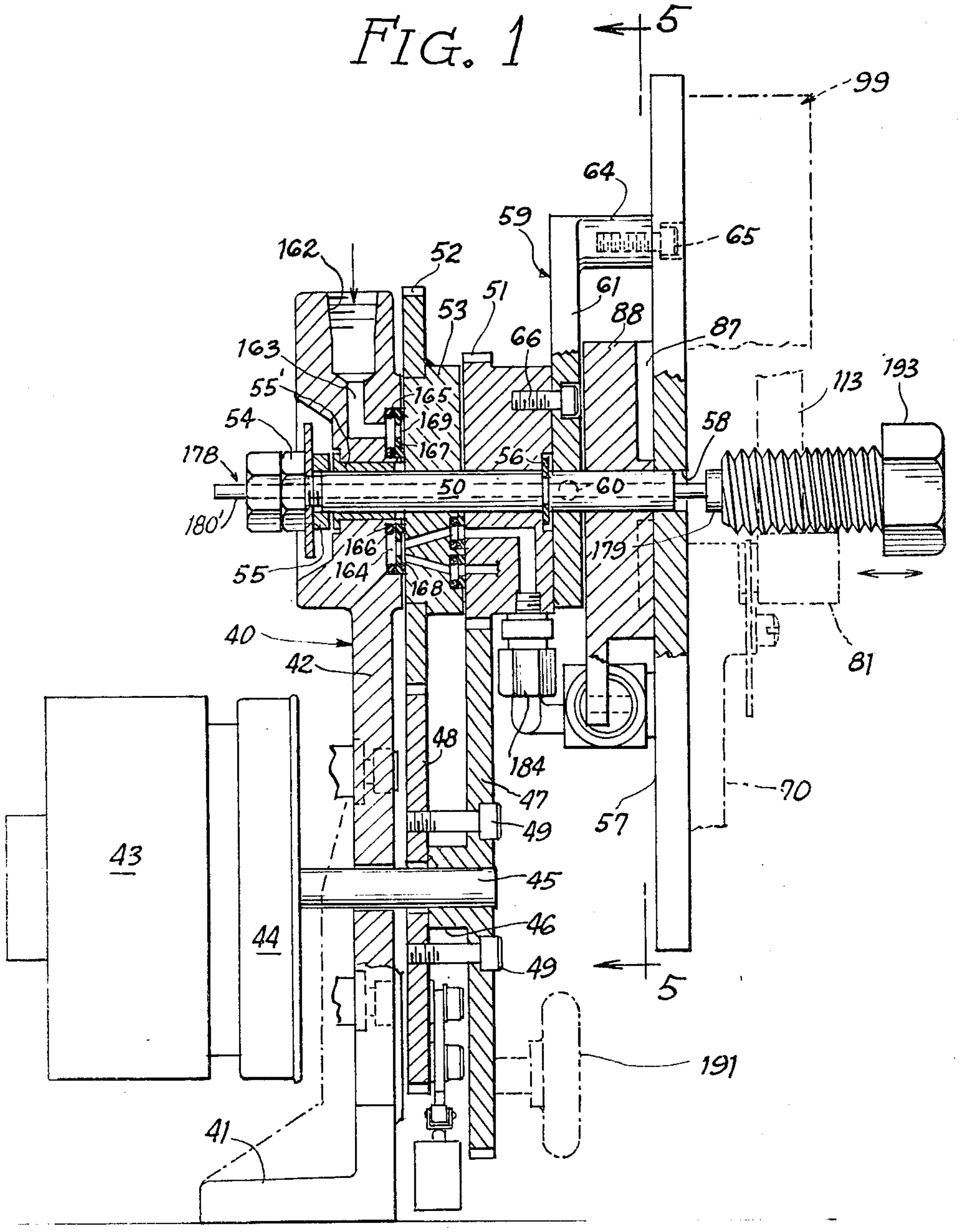
FIG. 1 is a side elevational view in section of a device incorporating this invention, the section being taken along line 1—1 of FIG. 2.

Referring now to the drawings for a detailed description of the invention, the apparatus is comprised of a frame 40 (FIGS. 1 and 2) which has horizontal feet 41 and a vertical plate 42 on which the principal portions of the mechanism are mounted. In the rear lower part of the vertical plate 42 is disposed a small electric motor 43 which has a reducing gear 44 built thereon and forming a part thereof, the output of the reducing gear comprising a shaft 45 which is disposed horizontally and extends through the vertical plate 42 into the hub 46 of a gear 47. Mounted concentrically with shaft 45 is a smaller gear 48 which is secured to gear 47 by a plurality of machine screws 49.

Also mounted on vertical plate 42 and above the gears 47, 48 is a second shaft 50 which extends horizontally through said plate and on which are mounted driven gears 51 and 52. Driven gear 51 carries with it the tape deck mechanism to be hereinafter described, and gear 52 drives a valve 53 in timed relation with the rotation of gear 51 and the tape deck secured thereto. The rear portion of shaft 50 is threaded to receive a nut 54 which, in turn, bears against a thrust bearing 55 disposed concentrically with respect to the shaft 50 and frictionally bearing against a shoulder bushing 55' in plate 42. A snap ring 56 on shaft 50 serves to hold the gear 51 against axial movement on shaft 50 toward the right, as viewed in FIG. 1.

Figure 3:
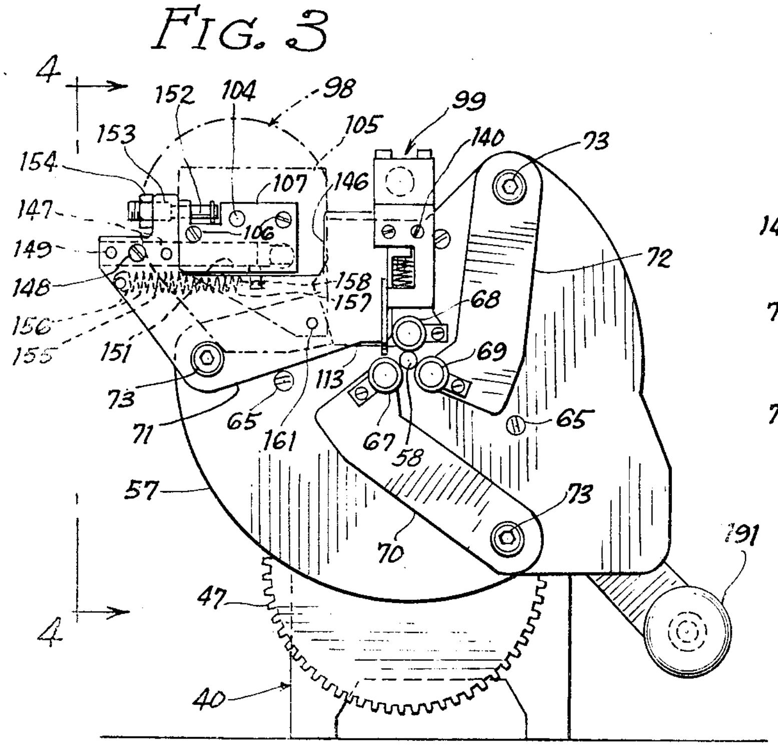
FIG. 3 is a front elevational view of a portion of the mechanism of FIG. 1, showing on a reduced scale the tape deck used in the device.

Referring now to FIG. 3 for a detailed description of the tape deck, the latter is comprised of a plate 57 of generally circular contour, having a central opening 58 therein by which it is mounted on the right hand end (FIG. 1) of shaft 50. Said plate 57 is secured to a spider 59 secured to shaft 50 for rotation therewith by a set screw 60 (shown dotted).

Figure 5:
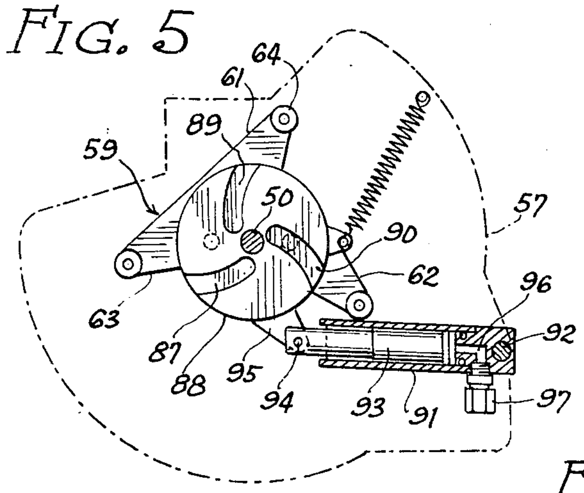
FIG. 5 is a front elevational view in section of the device with the tape deck removed and showing the chuck scroll used to move the rolls radially, the view being taken along line 5—5 of FIG. 1.

Spider 59 is shown in elevation in FIG. 5 and is comprised of three radially diverging arms 61, 62 and 63 on the end of each of which is a boss, one of which is shown at 64 in FIG. 1. Plate 57 is secured to bosses 64 by machine screws 65.

Spider 59 is driven in timed relation with gear 51 by a machine screw 66 which serves to fasten the central portion of the spider to the gear. It is contemplated that plate 57 will carry several parts of the machine including the rollers which press the tape into the threaded article, a supply of tape, a tape cut-off mechanism and the means for advancing the rollers toward the threaded article and removing the rollers therefrom to free the article after it has been wrapped with the tape. Each of these parts will be described in detail hereinafter.

Figure 4:
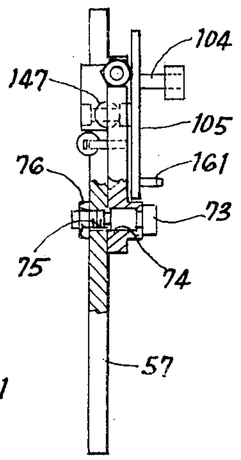
FIG. 4 is a side elevational view of the tape deck of FIG. 3, partly in section, the view being taken along line 4—4 of FIG. 3.

Considering first the rollers, which are shown more clearly in FIG. 3 at 67, 68 and 69, each roller is mounted for free rotation on the end of individual arms 70, 71 and 72, each of which, in turn, is pivoted for rotation on plate 57. A typical pivotal mounting for an arm is shown in FIG. 4, and is comprised of a shoulder screw 73 which passes through an appropriate opening 74 in the end of an arm and also through a threaded opening 75 in plate 57. To prevent inadvertent loosening of shoulder screw 73, a lock nut 76 is applied to the free end thereof.

The means for mounting the rollers on the arms is shown more clearly in FIGS. 19 and 20, said means comprising an axle 77 having a central threaded portion 78 by which the axle is secured to an appropriately threaded opening in arm 70. The free end 79 on the left hand end of axle 78, as shown in FIG. 20, has mounted thereon a shoulder bushing 80 on which is mounted, in turn, a rubber tire 81 held on the bushing 80 by friction or by any other suitable means. Bushing 80 is held against axial movement on end 79 by a clip 82 which is received in an appropriate groove 83 in the shoulder portion of the bushing and is secured to arm 70 by a machine screw 84.

The opposite free end 85 of axle 77 extends through a slot 86 in plate 57 and into a spiral groove 87 (FIGS. 1 and 5) formed in a scroll 88 disposed on shaft 50 for free rotation thereon and located between plate 57 and spider 59. Scroll 88 has two other spiral grooves, 89 and 90, formed therein, all of said spiral grooves 87, 89 and 90 being equiangularly spaced and of identical contour.

Scroll 88, through its connections with the rollers 67, 68, 69, controls the location of said rollers from the axis of shaft 50. This controlling function is, in turn, effected by oscillating such scroll 88 about the shaft 50 through a predetermined angle. The oscillation of scroll 88 is brought about by a pneumatic cylinder 91 (FIG. 5) pivotally mounted at 92 on plate 57. Said cylinder 91 has disposed therein a piston 93 the free end of which is pivotally connected at 94 to an ear 95 formed integrally with scroll 88. Air under pressure is admitted into cylinder 91 through appropriate passages 96 which terminate in a fitting 97 located at the side of cylinder 91. Thus, as air under pressure, for example, is admitted to cylinder 91, piston 93 is reciprocated in cylinder 91 and, in turn, serves to oscillate ear 95 and the scroll 88 of which it is a part.

Arms 70 and 72 (FIG. 3) are substantially identical in all respects and simply serve to exert pressure upon the rollers carried thereby to urge said rollers against the tape being applied to the threaded article (FIG. 1) held between the three rollers. Arm 71, however, is of different shape from arms 70 and 72 and performs an additional function to that of exerting pressure on the tape being applied. Said arm 71 as shown in FIG. 3 carries a supply of tape, shown generally in dotted outline at 98, and a tape cut-off mechanism shown generally at 99. The tape supply may take the form of a cartridge such as is shown in FIGS. 14 to 18 inclusive, such cartridge comprising, in the form chosen to illustrate the invention, a two-part plastic housing 100 having a spool 101 on which the tape is spirally wound. The tape itself is shown at 102 and is comprised of unsintered polytetrafluoroethylene which, for the purpose of this invention, is made approximately .035" in thickness and of any desired width suitable for the objectives intended for it. In the illustrative example, the width of tape 102 is one-half inch, but it is contemplated that the same cartridge will accommodate lesser widths ranging from the said one-half inch to one-eighth inch. Said housing has further a central bushing 103 by which it is mounted on a spindle 104 (FIG. 4) extending horizontally from a mounting plate 105 secured by screws 106 (FIG. 3) to a reciprocating carrier 107.

The spool 101 on which tape 102 is wound (FIG. 15) is loosely rotatable in housing 100. The free end 113 (FIG. 14) of the tape passes through a flat opening 114 in the housing 100 which is disposed generally tangentially from the roll. Said opening 114 is defined on one side by a channel shaped strip 115 anchored at one end 120 to a pin 121 on the housing 100 and on the other side by a flat metal guide 116, one end 117 of which is anchored in a slot 119 in the housing 100, and the other end 118 of which extends upwardly against the free end 113 of the tape. Flat metal strip 116 has some resilience and provides a frictional resistance against the tape to prevent movement of the tape relative to the metal strip 115 after the tape has been severed.

Metal guide 115 has a generally shallow cross-section throughout its length. It may be observed that by making the metal guide narrower and forming a lateral extension 122 (FIGS. 17 and 18) on the side of the insert various widths of tape can be accommodated in the same housing.

Also mounted on arm 71 is the cut-off mechanism 99 as previously stated. Said mechanism 99 is shown in detail in FIGS. 21 and 22 and is comprised essentially of a block of metal 123 which has a transverse groove 124 of considerable depth formed therein. A circular bore 125 is formed in block 123 and intersects groove 124 to form the cylinder for a piston 126 by which a guillotine type blade 127 is reciprocated across the tape to cut the tape from the feed roll. Said blade 127 is substantially T-shaped, the cross-bar of the T being shown at 128 and the tail at 129, the latter being appropriately secured to a collar 130 threaded over a pin 131 extending from piston 126. A compression spring 132 is disposed in groove 124 and serves to hold the collar 130 against the piston 126 and also to urge the piston 126 into its cylinder for its return stroke.

The lower part 133 of the block 123 is machined off parallel to the bottom of groove 124 and an anvil 134 is secured to said lower part 133 by shoulder screws 135, the latter in turn serving to provide a space between the anvil and the lower part 133 in which the blade 127 can reciprocate. The surface of blade 127 adjacent to the lower part 133 has a small depression 136 formed therein into which the ball 137 of a ball detent is urged by a spring 138. The said lower part 133 has an appropriate opening 139 therein to receive spring 138 and ball 137.

Block 123 is secured to arm 71 by a pair of machine screws 140 (FIG. 3) and cylinder 125 is closed by a head 141 which is secured to block 123 by similar machine screws 142.

As shown in FIGS. 3 and 22, the tape to be applied to the threaded article is fed from the supply cartridge 98 toward the cut-off 99 through a slot 143 formed in the side of the anvil 134. The cutting edge 144 of the blade 127 is normally poised just above slot 143. The controls for piston 126 are such that at the appropriate time, blade 127 is moved across slot 143 and therefore across the tape extending therethrough to cut said tape by a scissors action between the cutting edge 144 and the inner edge 145 of the slot 143.

A required function of the machine is to move the end of the tape on the supply reel into the area between the article to be wrapped and roller 68 adjacent the supply reel, so that the tape may be frictionally grasped therebetween and wound around the article. The tape cut-off point, as is apparent from FIG. 3, is a short distance from the area of contact between roller 68 and the article, and therefore means must be provided for reciprocating the tape supply toward and away from the roller 68 in timed relation to the tape cut-off function. The mechanism by which the tape supply is reciprocated will now be described.

Arm 71, as shown in FIGS. 3 and 4, has a square notch 146 formed in its upper surface into which a cylindrical pin 147 projects. Said pin is retained in an appropriate opening in the left side of arm 71 as viewed in FIG. 3 and is secured thereto against axial movement by a transverse screw 148 and a pair of locating pins 149, the function of which is to insure a predetermined fixed position of the pin 147 with respect to arm 71.

Pin 147 functions as the piston of a pneumatic cylinder, the cylinder being formed as a recess 151 in the previously described carrier 107. Said carrier 107 is prevented from rotating on pin 147 by another pin 152 threaded into a lug 153 formed on the lefthand side of notch 146, as viewed in FIG. 3. A lock nut 154 serves to fix the position of pin 152 in lug 153. Carrier 107 is normally urged toward lug 153 by a tension spring 155 one end of which 156 is secured to an appropriate pin on arm 71 and the other end 157 is secured to a pin 158 extending downward from carrier 107.

The cartridge tape supply 98 is mounted on plate 105 by means of the aforementioned spindle 104 which passes through bushing 103 in housing 100. One or more locating pins 161 on the mounting plate 105 (FIGS. 3 and 4) passes through an appropriate opening 161' (FIG. 14) in housing 100 to prevent the cartridge supply 98 from rotating about the spindle 104.

The pneumatic circuit leading to each of the cylinders will now be described.

Figure 7:
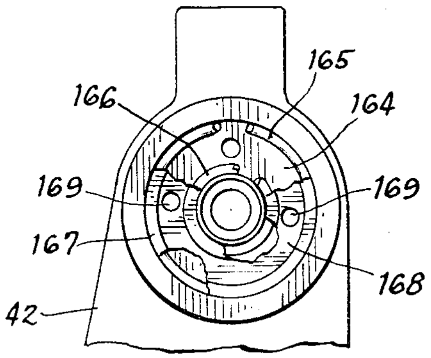
FIGS. 7 through 13, inclusive, show various valves and gas transfer elements used in the device.
Figures 23, 24:
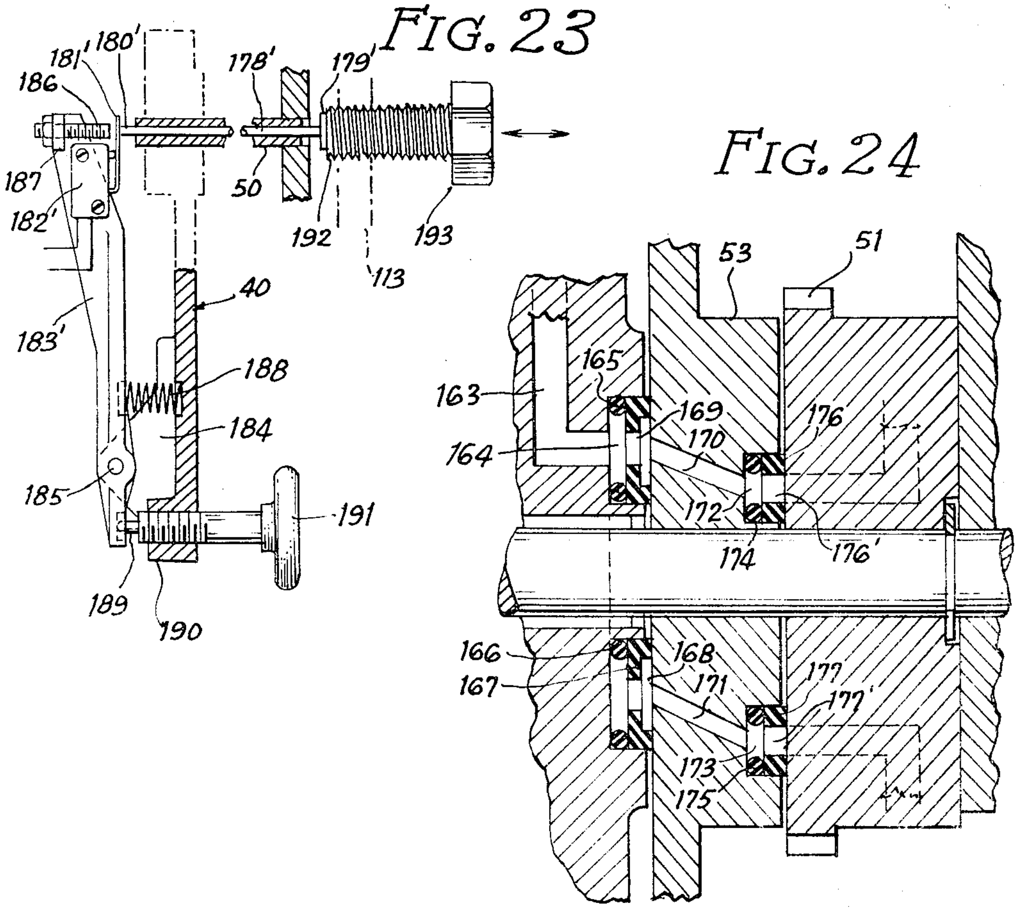
FIG. 23 is a side elevational view of the mechanism for adjusting the location of the tape on the article to be wrapped.
FIG. 24 is an enlarged fragmentary side elevation in section through the valves of FIG. 1, showing said valves in another stage of operation.

Referring first to FIGS. 1 and 24, air under pressure from a suitable source of supply (not shown) is fed to an inlet opening 162 in the upper portion of the vertical plate 42 from whence it is conducted by a passage 163 to an annular recess 164 (FIGS. 1 and 7) formed in the side of the plate 42. Within annular recess 164 are disposed concentric "O" rings 165 and 166 upon which is placed a relatively flat washer-like ring 167 preferably made of an antifriction material such as Teflon or the like. Said washer has an annular recess 168 formed in a side thereof which communicates with the recess 164 through one or more supply holes 169.

Figure 8:
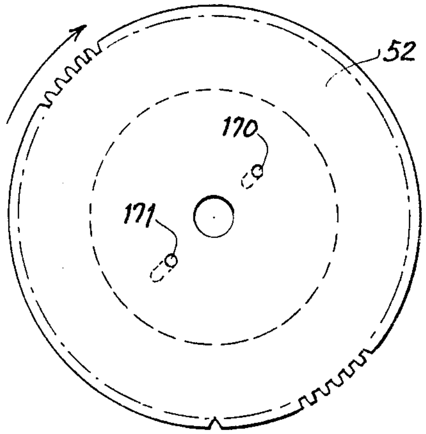
Figure 9:
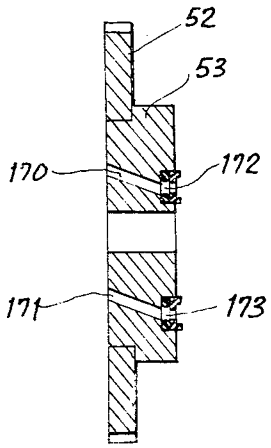
Figure 10:
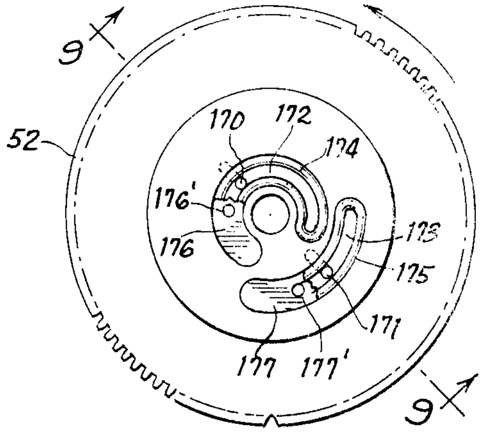

It may be observed from FIGS. 1 and 24 that washer 167 protrudes beyond the surface of the side of vertical plate 42 and is contacted by the side of valve 53, said valve as shown more clearly in FIGS. 8 and 9 having a pair of angularly disposed passages 170 and 171 formed therein, which, in the form selected to illustrate the invention, are shown located 180° apart. Each of said passages 170 and 171 terminates in arcuately shaped recesses 172 and 173, respectively, shown more clearly in FIG. 10. Arcuate recesses 172 and 173 are each provided with an "O" ring 174 and 175, respectively, the dimension of each of which is selected to cause the "O" ring to fit snugly within the outer and inner peripheries of its recess. Over said "O" rings 174 and 175 are placed correspondingly arcuately shaped Teflon inserts 176 and 177, respectively, which protrude beyond the surface of the valve 53 and have openings 176' and 177' in communication with the interior of the said arcuate recesses.

Figure 11:
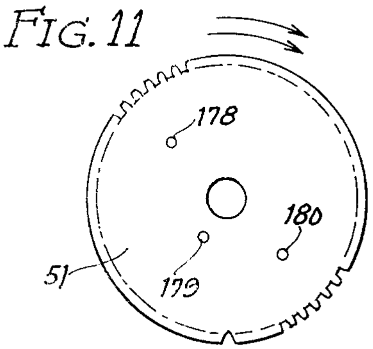
Figure 12:
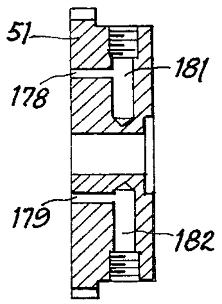
Figure 13:
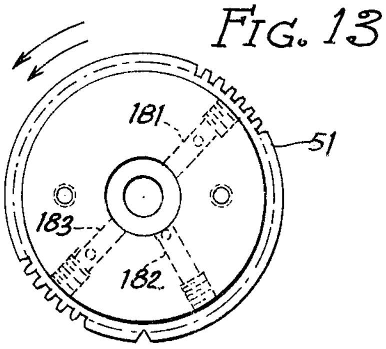

Adjacent the valve 53 is the driven gear 51 which, as shown in FIG. 11, is considerably wider than the teeth thereof to provide a body through which passageways may be formed to conduct air under pressure to fittings ultimately leading to each of the three cylinders on plate 57. Thus, as shown in FIG. 11, the body of the gear 51 may be drilled with axial openings 178, 179, 180, leading respectively to radially disposed passages 181, 182 and 183 (FIGS. 12 and 13). The ends of the radial passages 181, 182 and 183 are tapped to receive fittings such as 184 (FIG. 1), each of which fittings, in turn, is provided with a flexible hose leading to each of the said cylinders. Thus, for example, the hose from the radial passage 181 is connected to a fitting 185 mounted on the side of the head 141 of the cylinder which controls the blade 127. Head 141 is appropriately drilled to provide passages 186 connecting the fittings 185 with the circular bore 125.

The relative locations of the passages 178, 179, 180 and the arcuate recesses 172 and 173 are such that as the valve 53 is rotated relative to the gear 51 air will be admitted in a predetermined sequence to the various cylinders to perform the operations required thereof. The venting of the various cylinders is accomplished merely by causing the axial openings 178, 179, 180 to rotate beyond the arcuate Teflon inserts. It may be recalled that these inserts extend beyond the surface of the valves so that as the openings pass beyond the inserts they are opened to atmosphere through the gap between the valve and the adjacent gear.

For optimum valve design it is desirable that the valve 53 rotate once per wrapping cycle. For optimum wrapping of the tape around the article, however, it is desirable that, first, the correct number of turns be applied and, second, that enough pressure is applied over the entire wrapped tape to insure the embedding of the tape into the threads of the article. Thus the tape deck will rotate not only the requisite number of times for the tape to be wrapped, that is, one and one-half turns for one and one-half wraps of tape, but it will have to rotate for a period beyond that to make certain that after the tape has been cut off, the end of the tape is properly embedded into the threads.

In the valve arrangement shown in FIGS. 7 through 13 inclusive, the length of the arcuate recesses 172, 173 is such that the necessary functions will be performed in the desired sequence and for the requisite length of time. Arcuate recess 173 supplies air under pressure first to port 180, which controls the feed function, and then to port 178, which controls the slice or cut-off function. Since the nose of the feed cartridge is advanced under knife 127 to start the tape under the first roller, it must be retracted before the slice operation is performed. Thus arcuate recess 173 is rotated past port 180 before it is aligned with port 178 to assure the exhausting of the feed cylinder and return of the cartridge before the cut-off cylinder is operated.

Figure 2:
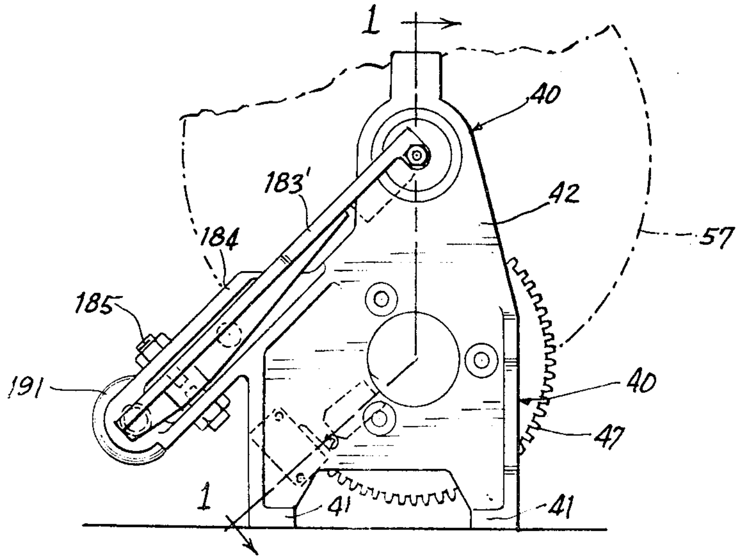
FIG. 2 is a rear elevational view on a reduced scale of the device of FIG. 1.
Figure 6:
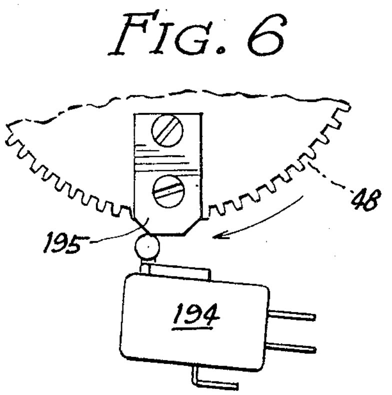
FIG. 6 is a fragmentary front elevational view of a control cam and of an electric switch operated thereby.
Figure 14:
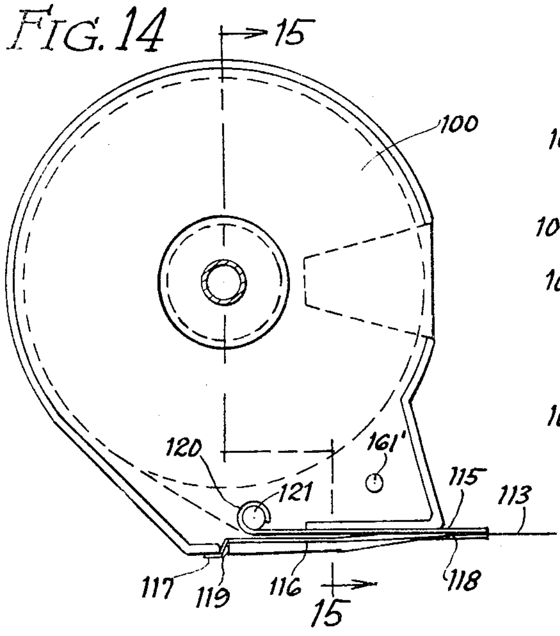
FIG. 14 is a plan view in section of a cartridge used in the device of FIG. 1 for holding a quantity of the tape to be applied.
Figure 15:
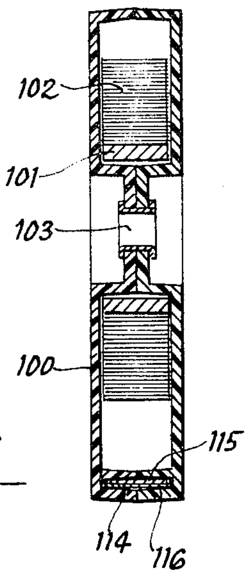
FIG. 15 is a cross-sectional view through the cartridge of FIG. 14 taken along lines 15—15 thereof.
Figure 17:
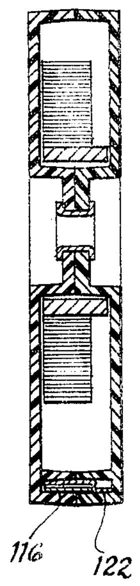
FIG. 17 is a cross-sectional view through a modification of the cartridge of FIG. 14.
Figure 16:
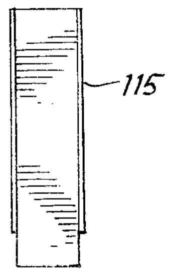
FIG. 16 is a bottom view of a tape guide shoe used in the cartridge of FIG. 15.
Figure 18:
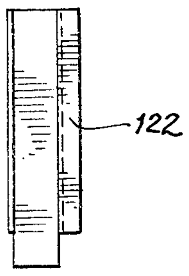
FIG. 18 is a bottom view of the tape guide shoe for the cartridge of FIG. 17.

A feature of the present device is that the location of the tape on the threads of the article relative to the end of the threads can be readily changed. The means for accomplishing this result is shown in FIGS. 2, 6 and 23. Said means is incorporated in the control for starting a wrapping cycle, said control comprising a rod 178' which passes freely through shaft 50 for axial movement therein. The forward end of rod 178' has a head 179' formed thereon which is adapted to be contacted by the end of the article to be wrapped. The rear end 180' of control rod 178' contacts a leaf spring 181' forming part of a switch 182' fixedly mounted on a lever 183' extending downwardly to a bracket 184 on which it is pivoted at 185 for oscillatory movement about an axis disposed transversely to the axis of rod 178'. An adjustable stop 186 threaded into a flange 187 on lever 183' limits movement of leaf spring 181'.

Lever 183' is normally urged in a counter-clockwise direction as viewed in FIG. 23 by a compression spring 188 inserted between lever 183' and bracket 184 above pivot 185. Such counter-clockwise rotation is limited by an adjustable stop 189 threaded into an appropriate boss 190 on bracket 184 and extending forwardly of the device to terminate in a large control knob 191. It may be apparent that by turning knob 191, lever 183' and its stop 186 will be moved relative to the end of shaft 50 so that the control rod 178' in said shaft will contact spring 181 at any desired position of rod 178' in shaft 50. This, in turn, will cause the end 192 of the bolt or other article 193 to be arrested at various axial positions thereof relative to the axially fixed tape supply 98 and thereby determine the axial location of the tape on the threads of said article.

Figure 25:
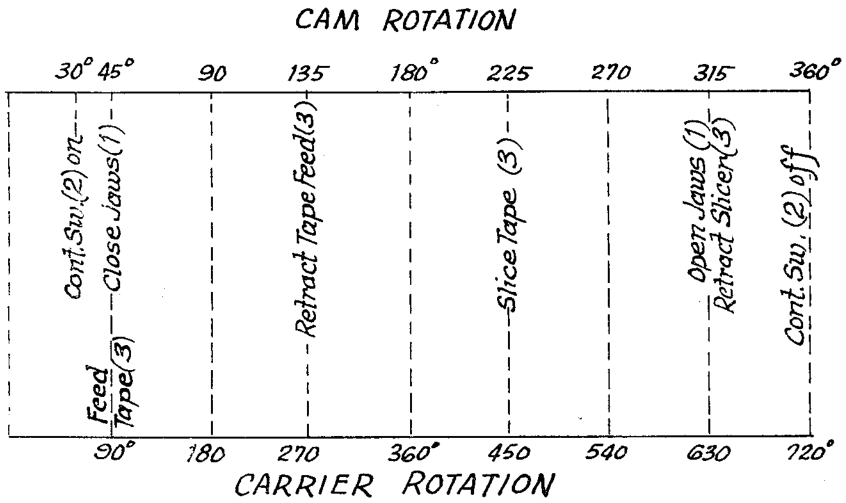
FIG. 25 is a sequence diagram of the functions performed by the device.

The sequence of the operations performed by the device is shown diagrammatically in FIG. 25. The first operation, namely, starting motor 43, is performed manually by inserting the article between the rollers 67, 68 and 69 and pushing rod 178' until it is stopped by stop 186. Switch 182' is thus turned on and motor 43 is started to rotate the gears, valve 53, and plate or tape deck 57. Since valve 53 rotates one revolution per cycle, the timing of the operations may be related to the movement of valve 53. Thus at 45° from rest, the rollers are moved inwardly and the tape supply is moved toward the article. At 135°, the tape supply is retracted. At 225° the tape is cut off, following which the rollers continue to press the tape, particularly the cut-off end thereof, into the threads of the article. At 315° the rollers are retracted and the cut-off mechanism is likewise pulled back to its initial position. At this point the article is free to be withdrawn from the device.

It is desirable, however, that the cycle be started at the same relative position of the valves, and since the article can be withdrawn at any point from 315° to 360°, the valve could be stopped at any point within the remaining 45°, which is undesirable. Accordingly, a second switch 194 (FIG. 6), which may be termed a sustainer switch, is added to the motor circuit in parallel with switch 182'. The sustainer switch 194 is mounted on vertical plate 42 adjacent gear 48 which makes one revolution per cycle. A cam 195 is secured to the side of gear 48 so as to rotate with it, and is adapted to engage switch 194 at approximately 340° of rotation of the valve 53 to turn said switch off. Said cam holds said switch off for the remaining rotation of gear 48 which continues due to momentum of the rotating parts until a brake mechanism (not shown) forming part of the motor 43 is automatically applied to arrest the motor armature. Cam 195 continues to hold the switch 194 in its "off" position until after the gear has rotated through the first 30° of the next cycle which, it will be remembered, is initiated by the insertion of another article against control rod 178 to turn switch 182' on.

In the form of wrapping device described above, the valve member 53 is a plate which is rotatable between two other plates to control the flow of fluid under pressure between the latter. The effectiveness of the seal between the several plates depend upon the axial pressure exerted upon the "O" rings 165, 166, 174 and 175. This pressure may at times create frictional forces which become too great for motor 43 to handle effectively. A second form of valve, not dependent upon axial sealing pressure, may therefore be preferable. Such second form is shown in FIG. 26 and will now be described.

Figure 26:
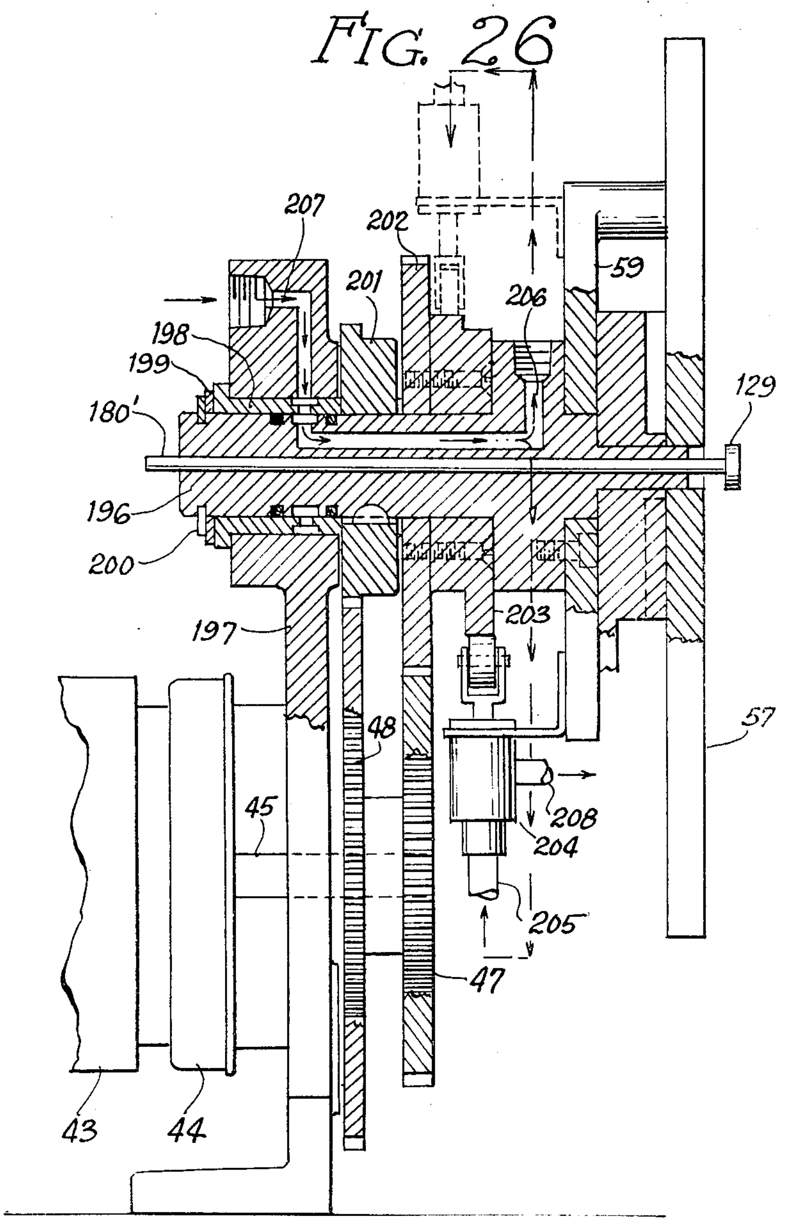
FIG. 26 is a fragmentary side elevational view, partly in section of a modification of the device of FIG. 1.

In FIG. 26, spider 59 is mounted on a shaft 196 supported from a vertical plate 197 through a shouldered bushing 198. Said bushing bears against a shim 199 and a snap ring 200 on one side and on the other side against a gear 201 keyed to shaft 196 to drive said shaft. Gear 201 is driven from gear 48 and motor 43 through reduction gearing 44 and shaft 45. Gear 47 is keyed or otherwise affixed to shaft 45, all substantially as described with reference to the FIG. 1 form. Gear 47 drives a gear 202 mounted for rotation on shaft 196, and gear 202 drives a single piece double cam 203 the function of which is to control the operation of three valves affixed to spider 59 so as to be rotatable therewith. One such valve 204 is shown in FIG. 26, it being understood that the remaining valves may be identical therewith. Each valve 204 is connected through a hose 205 to a single passage 206 in shaft 196 which is connected to an inlet passage 207 in stationary plate 197 leading to a source of fluid under pressure. The outlet 208 of each valve 204 is connected to one of the three cylinders 91, 125 and 151.

The shape of the cams 203 and the specific valves operated by the cams determine the sequence and duration of operation of each valve 205. A change in sequence or duration can be readily effected in the FIG. 20 form merely by replacing double cam 203 with one having the desired contour. It may be noted that the seal between shaft 196 and inlet 207 is a radial seal and hence frictional forces between the shaft and its support are reduced to a minimum.

The sequence of operation of the FIG. 26 form is identical to that of the FIG. 1 form and hence will not be repeated here.

It is understood that although the fluid motive power described above is air under pressure, such as is available in most shops, said motive power may also be oil or other liquid under pressure. It is understood further that various pressure reducing and regulating devices may be used in the fluid system to provide the correct pressure at all times for the fluid operated devices described herein.

I claim:

1. A device for wrapping a tape around a substantially cylindrical article, said device comprising in combination, a frame, a shaft mounted for rotation in said frame, a motor, means connecting said motor to said shaft to drive said shaft, a plate disposed radially of said shaft and mounted on said shaft for rotation therewith, a plurality of rollers adjacent said plate and disposed with their axes substantially parallel with one another and with the shaft, means mounting said rollers on said plate for radial movement relative to said shaft, means for moving said roller-mounting means radially of said shaft to move said rollers against an article around which a tape is to be wrapped, a supply of tape, means mounting said supply of tape on one of said roller mounting means, means for advancing said tape supply toward the article and withdrawing said tape supply therefrom, means for cutting off the tape to be wrapped from said tape supply, and means operated in timed relation with the rotation of said shaft for controlling the sequence and duration of operation of the several means for moving said rollers, for advancing and withdrawing the tape supply and for cutting off the tape to be wrapped.

2. A device as described in claim 1, a source of fluid under pressure, said means for moving said rollers radially comprising a pressure-differential operated motor, and said means operated in timed relation with the rotation of said shaft comprising valve means rotated in timed relation with said shaft, and means connecting said source of fluid under pressure to said valve means and said valve means to said pressure-differential operated motor.

3. A device as described in claim 1, and adjustable means for determining the axial location of the tape on the article relative to the end of the article.

4. A device as described in claim 1, adjustable means for determining the axial location of the tape on the article relative to the end of the article, and means operated by said adjustable means for initiating the operation of said motor for driving said shaft.

5. A device as described in claim 4, and other means mounted in part on said plate and rotatable therewith, and mounted in part on said frame for controlling the operation of said motor to cause said plate to stop at a predetermined angular location relative to said frame.

6. A device as described in claim 1, said means mounting said rollers on said plate comprising individual arms for each roller, and means pivotally mounting said arms on said plate, said rollers being mounted on the radially inner ends of said arms, said means mounting said supply of tape on the plate comprising a carriage on one of said arms and reciprocable thereon toward and away from the roller on said one of said arms, means removably mounting said tape supply on said carriage, and means for reciprocating said carriage in timed relation to the rotation of said plate.

7. A device as described in claim 1, said means mounting said rollers on said plate comprising individual arms for each roller and means pivotally mounting said arms on said plate, said rollers being mounted on the radially inner ends of said arms, and said means for cutting off the wrapped tape from said tape supply comprising a knife, means mounting said knife on one of said arms for reciprocation toward and away from said tape, and means for reciprocating said knife in timed relation to the rotation of said plate.

8. A device as described in claim 7, said means mounting said supply of tape on the plate comprising a carriage on said one of said arms reciprocable thereon toward and away from the roller on said one of said arms, and means for reciprocating said carriage in timed relation to the rotation of said plate.

9. A device as described in claim 1, said means for moving said rollers radially, and said means for advancing said tape supply toward the article and said means for cutting off the wrapped tape each comprising pressure-differential operated fluid power means, said device further comprising individual valves for controlling the application of fluid under pressure to said power means, cam means for controlling operation of said valves, and means driven by said motor for estabilshing relative rotation between the cam means and valves to operate said valves in timed relation to the rotation of said shaft.

10. A device as described in claim 9, means for rotating said cams in timed relation with said shaft, means mounting said valves on said plate, and means for conducting fluid from said fluid power means to said rotating shaft, and from said rotating shaft to said valves.

11. A device as described in claim 1, the inner peripheries o fsaid rollers being equally spaced from the axis of said shaft, said shaft having an axially extending opening therein, a pin in said opening and movable axially therein, said pin extending outwardly toward said article and contacted thereby, switch means controlling the operation of said motor, and means mounting said switch means on said frame for operation by said rod.

12. A device as described in claim 11, and means for adjusting the position of said switch means axially of said pin, whereby to alter the axial position of said pin at which said switch is operated thereby, thus to control the location of the tape on the article relative to the end of said article.

13. A device as described in claim 1, said means mounting said tape supply comprising a carriage, said one of said roller mounting means having a notch formed in a side thereof in which said carriage is disposed, and said means for advancing said tape supply comprising a lug on said one of said roller mounting means adjacent said notch, a piston secured to said lug and extending toward said carriage, said carriage having a recess therein to receive said piston and to form therewith a fluid power motor, means preventing rotation of said carriage around said piston, and resilient means on said one roller mounting means and connected to said carriage to urge said carriage away from said article.

14. A device as described in claim 13, said means for cutting off the tape to be wrapped comprising a blade, means mounting said blade on said one of said arms for reciprocation across said tape to be wrapped around said article, said blade mounting means being disposed between the roller and tape supply on said one of said arms.

15. A device as described in claim 13, said means for cutting off the tape to be wrapped comprising a blade, means mounting said blade on said one of said arms for reciprocation across said tape to be wrapped, said tape supply including a cartridge in which the tape is disposed, said cartridge having a rigid tape guide extending therefrom toward the article and under said blade and said means for controlling the sequence and duration of operation of the means for advancing and withdrawing the tape supply and for cutting off the tape to be wrapped comprising means for withdrawing the tape supply and rigid tape guide prior to cutting off the tape to be wrapped.

16. A tape dispenser comprising a housing having a central hub and an annular chamber for the reception of a roll of tape, said housing having a peripheral extension defining a relatively flat opening through which tape from said roll is passed, a pin in the housing adjacent the inner end of said opening, a tape guide anchored to said pin and extending through said opening, a spring extending through and beyond said opening, and means for anchoring said spring to said housing and for providing an initial bias in the spring in the direction of the guide, said tape passing between said spring and said guide and said spring pressing the tape against the guide to interpose a resistance to the movement of the tape through said opening.

17. A tape dispenser as described in claim 16, said tape guide being substantially flat over its central region and rigid, and said spring being a flat spring bearing against said central region.

18. A tape dispenser as described in claim 16, said tape guide being substantially channel-shaped in cross-section, the width of the interior of the channel being substantially equal to the width of the tape.

References Cited

UNITED STATES PATENTS

| | | | |
|---|---|---|---|
| 1,106,437 | 8/1914 | Baldwin | 156—526 |
| 1,883,401 | 10/1932 | Rolfs et al. | 156—428 X |
| 2,560,241 | 7/1951 | Pangburn et al. | 156—577 |
| 3,250,658 | 5/1966 | Pate et al. | 156—428 |

SAMUEL W. ENGLE, Primary Examiner

U.S. Cl. X.R.

156—428, 577; 206—52; 242—7.01, 55.53

PO-1050
(5/69)

UNITED STATES PATENT OFFICE
CERTIFICATE OF CORRECTION

Patent No. 3,508,998 Dated April 28, 1970

Inventor(s) ROBERT A. BILBREY

It is certified that error appears in the above-identified patent and that said Letters Patent are hereby corrected as shown below:

Column 2, line 21, "cylinder" should be -- cylinders --

Column 5, line 6, after "shallow" insert -- channel --

SIGNED AND
SEALED
AUG 25 1970

(SEAL)
Attest:

Edward M. Fletcher, Jr.
Attesting Officer

WILLIAM E. SCHUYLER, JR.
Commissioner of Patents